United States Patent
Ezure et al.

(10) Patent No.: US 12,449,438 B2
(45) Date of Patent: Oct. 21, 2025

(54) CELL PICKING DEVICE AND CELL PICKING METHOD

(71) Applicant: SHIMADZU CORPORATION, Kyoto (JP)

(72) Inventors: Toru Ezure, Kyoto (JP); Mika Okada, Kyoto (JP); Yuki Kuzuhara, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 200 days.

(21) Appl. No.: 17/533,850

(22) Filed: Nov. 23, 2021

(65) Prior Publication Data

US 2022/0178961 A1   Jun. 9, 2022

(30) Foreign Application Priority Data

Dec. 7, 2020   (JP) ................. 2020-202967

(51) Int. Cl.
   *G01N 35/10*   (2006.01)
   *B01L 3/02*    (2006.01)
   (Continued)

(52) U.S. Cl.
   CPC .......... *G01N 35/1011* (2013.01); *B01L 3/021* (2013.01); *B01L 9/54* (2013.01);
   (Continued)

(58) Field of Classification Search
   CPC ......... G01N 35/1011; G01N 2035/103; G01N 2035/1086; G01N 2035/0422;
   (Continued)

(56) References Cited

U.S. PATENT DOCUMENTS

| | | | |
|---|---|---|---|
| 7,964,160 B2 * | 6/2011 | Zuppiger | B01L 3/021 422/503 |
| 12,099,072 B2 * | 9/2024 | Okada | G01N 35/1016 |

(Continued)

FOREIGN PATENT DOCUMENTS

| | | |
|---|---|---|
| CN | 204602216 U | 9/2015 |
| CN | 109387512 A | 2/2019 |

(Continued)

OTHER PUBLICATIONS

Fröhlich et al. "New techniques for isolation of single prokaryotic cells." FEMS microbiology reviews. 2000; 24.5: 567-572. doi.org/10.1111/j.1574-6976.2000.tb00558.x (Year: 2000).*

(Continued)

*Primary Examiner* — Aaron J Kosar
*Assistant Examiner* — Andrew T Moehlman
(74) *Attorney, Agent, or Firm* — Paratus Law Group, PLLC

(57) ABSTRACT

A cell picking device for sucking cells from a liquid sample in a sample container includes a sucking member to which a pipette tip is attachable, a driver that moves the sucking member and performs suction through the sucking member and the pipette tip, a work mode switcher that switches a work mode of the driver between a first mode and a second mode, and a controller that controls the driver.

8 Claims, 13 Drawing Sheets

(51) Int. Cl.
*B01L 9/00* (2006.01)
*C12M 1/00* (2006.01)
*C12M 1/26* (2006.01)
*C12N 1/02* (2006.01)

(52) U.S. Cl.
CPC ............ *C12M 33/04* (2013.01); *C12M 47/02* (2013.01); *C12N 1/02* (2013.01); *B01L 2300/027* (2013.01); *G01N 2035/103* (2013.01)

(58) Field of Classification Search
CPC ... G01N 2035/1034; B01L 3/021; B01L 9/54; B01L 2300/027; B01L 2200/025; C12M 33/04; C12M 47/02; C12M 1/00; C12N 1/02

See application file for complete search history.

(56) References Cited

U.S. PATENT DOCUMENTS

| | | |
|---|---|---|
| 2008/0264187 A1 | 10/2008 | Angus et al. |
| 2016/0139166 A1 | 5/2016 | Berberich et al. |
| 2016/0169775 A1 | 6/2016 | Kei et al. |
| 2016/0334429 A1 | 11/2016 | Abe et al. |
| 2017/0203290 A1 | 7/2017 | Ando et al. |
| 2018/0079999 A1 | 3/2018 | Blanchard |
| 2018/0087020 A1 | 3/2018 | Blanchard |
| 2018/0087021 A1 | 3/2018 | Blanchard |
| 2018/0119086 A1 | 5/2018 | Markussen et al. |
| 2018/0346868 A1 | 12/2018 | Blanchard |
| 2019/0031993 A1 | 1/2019 | Matsunaga et al. |
| 2019/0039070 A1 | 2/2019 | Matsunaga et al. |
| 2019/0049357 A1 | 2/2019 | Matsumoto et al. |
| 2019/0381495 A1 | 12/2019 | Tanaka et al. |
| 2020/0248132 A1 | 8/2020 | Markussen et al. |
| 2020/0347339 A1 | 11/2020 | Blanchard |
| 2020/0377833 A1 | 12/2020 | Inoue et al. |
| 2021/0222110 A1 | 7/2021 | Blanchard |
| 2021/0261903 A1 | 8/2021 | Blanchard |
| 2022/0089997 A1 | 3/2022 | Blanchard |
| 2022/0178961 A1 | 6/2022 | Ezure et al. |
| 2022/0243167 A1 | 8/2022 | Blanchard |
| 2022/0259546 A1 | 8/2022 | Blanchard |
| 2022/0276271 A1 * | 9/2022 | Okada ..................... B01L 3/021 |

FOREIGN PATENT DOCUMENTS

| | | | |
|---|---|---|---|
| CN | 111712561 A | | 9/2020 |
| JP | 2016-112012 A | | 6/2016 |
| JP | 2018-510659 A | | 4/2018 |
| JP | 2020120618 A | * | 8/2020 |
| WO | WO 2016/147239 A1 | | 9/2016 |
| WO | WO 2016/150446 A1 | | 9/2016 |
| WO | WO 2017/170993 A1 | | 10/2017 |
| WO | WO-2019018152 A1 | * | 1/2019 ............... B01L 3/02 |
| WO | WO-2019176093 A1 | * | 9/2019 ............ C12M 33/04 |

OTHER PUBLICATIONS

Berg et al., "Evaluation of liquid handling conditions in microplates". J Biomol Screen. 2001; 6(1): p. 47-56. doi: 10.1177/108705710100600107 (Year: 2001).*
Oct. 21, 2019, Translation of International Search Report issued for related PCT Application No. PCT/JP2019/029513.
Oct. 21, 2019, Written Opinion issued for related PCT Application No. PCT/JP2019/029513.
Dec. 11, 2023, Chinese Office Action issued for related CN Application No. 201980098273.5.
Oct. 15, 2019, Translation of International Search Report issued for related PCT Application No. PCT/JP2019/029512.
Oct. 15, 2019, Written Opinion issued for related PCT Application No. PCT/JP2019/029512.
Dec. 20, 2022, Japanese Notification of Reasons for Refusal issued for related JP Application No. 2021-536466.
Dec. 11, 2023, Chinese Office Action issued for related CN Application No. 201980098792.1.
Jun. 19, 2018, International Search Report issued for related PCT Application No. PCT/JP2018/010488.
Jun. 19, 2018, Written Opinion issued for related PCT Application No. PCT/JP2018/010488.
Dec. 21, 2022, Chinese Office Action issued for related CN Application No. 201880089296.5.
Practical Handbook of Middle School Chemistry Experiments, Education Science Press, May 31, 1991, p. 28.
Mar. 31, 2023, Chinese Notice of Decision of Refusal issued for related CN Application No. 201880089296.5.
Jun. 3, 2024, Chinese Office Action issued for related CN Application No. 201980098273.5.
Jun. 5, 2024, Chinese Decision of Refusal issued for related CN Application No. 201980098792.1.
Jul. 4, 2024, Chinese Office Action issued for related CN Application No. 201980098273.5.
Aug. 29, 2024, Chinese Office Action issued for related CN Application No. 202111477180.9.
Nov. 29, 2024, Chinese Office Action issued for related CN Application No. 202111477180.9.
Nov. 5, 2024, U.S. Office Action issued for related U.S. Appl. No. 17/626,841.
May 19, 2025, United States Office Action issued for related U.S. Appl. No. 17/626,841.
Jun. 3, 2025, Chinese Office Action issued for related CN Application No. 202111477180.9.
Aug. 14, 2025, Chinese Office Action issued for related CN Application No. 202111477180.9.

* cited by examiner

F I G. 5
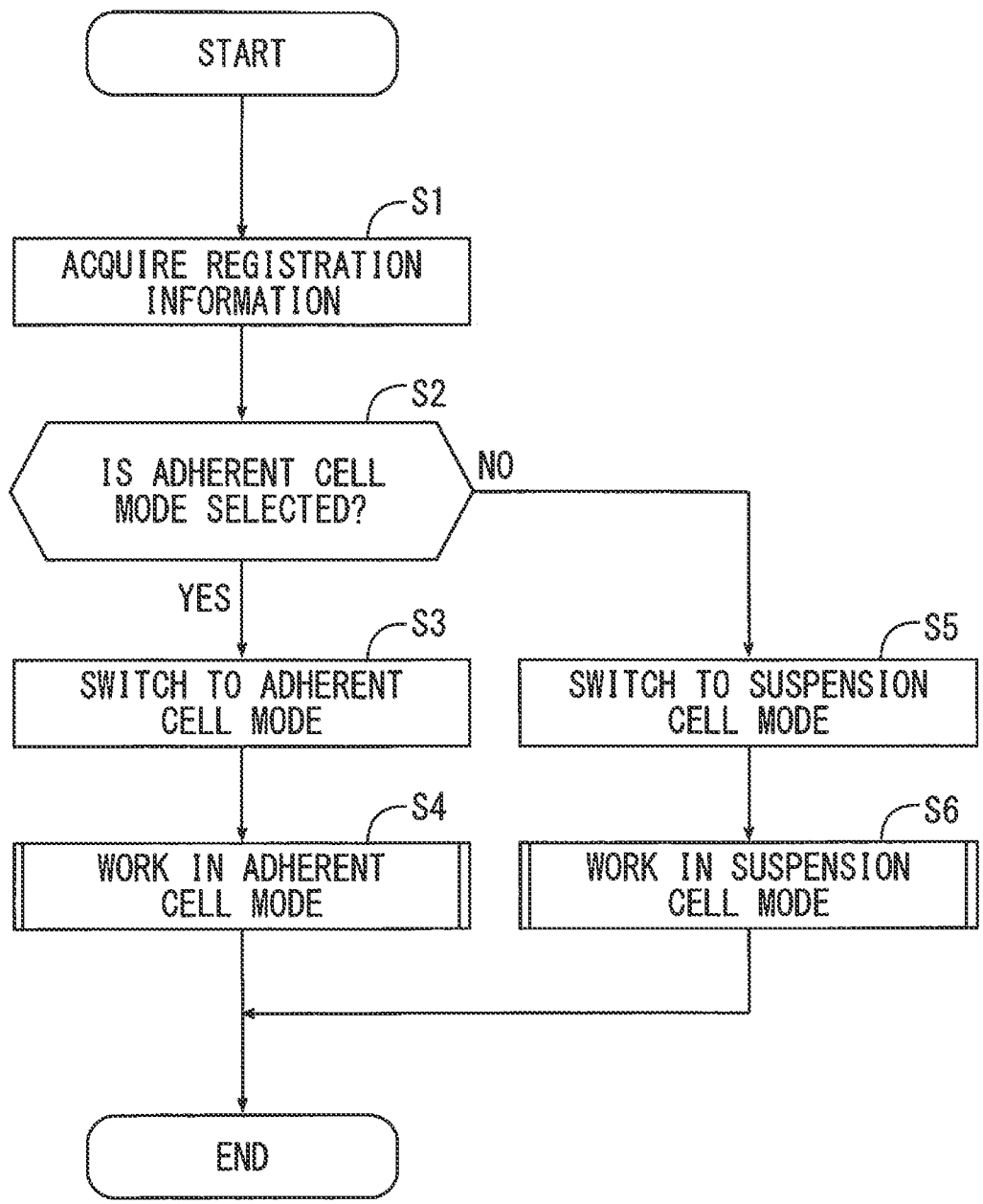

CELL PICKING DEVICE AND CELL PICKING METHOD

CROSS REFERENCE TO PRIOR APPLICATION

This application claims priority to Japanese Patent Application No. 2020-202967 (filed on Dec. 7, 2020), which is hereby incorporated by reference in its entirety.

BACKGROUND

Technical Field

The present invention relates to a cell picking device and a cell picking method.

Description of Related Art

In a case where specific cells are to be sucked from a container such as a cell culture container, a worker sucks the cells manually using a suction tool such as a pipette while checking the position of the subject cells with a microscope. However, since such work requires skill, an unskilled worker cannot easily suck cells. As such, a cell-sucking system that assists cell-sucking work has been suggested (see JP 2016-112012 A, for example).

In the cell-sucking system described in JP 2016-112012 A, a tubular pipette tip for sucking cells stored in a container is attached to a sucker. The position of the sucker is adjusted three-dimensionally by a transporter such that the end of the tip is in close proximity to specific cells.

SUMMARY

However, in the above-mentioned cell-sucking system, it may not be possible to suck cells efficiently into the tip depending on a state of cells in a sample.

An object of the present invention is to provide a cell picking device and a cell picking method that enable efficient suction of cells in accordance with a state of cells in a sample.

A cell picking device according to one aspect of the present invention for sucking cells from a liquid sample in a sample container, may include a sucking member to which a pipette tip is attachable, a driver that moves the sucking member and performs suction through the sucking member and the pipette tip, a work mode switcher that switches a work mode of the driver between a first mode and a second mode, and a controller that controls the driver, wherein the controller, in the first mode, may control the driver such that first advancing work for bringing an end of the pipette tip into contact with a bottom surface in the sample container by causing the sucking member to advance in an axial direction of the pipette tip with the pipette tip, attached to the sucking member, being tilted with respect to a vertical direction, scanning work for scanning the bottom surface of the sample container toward a first position using the end of the pipette tip by moving the sucking member in a horizontal direction, tilting work for lifting the end of the pipette tip and lowering a base of the pipette tip in the first position by tilting the sucking member further with respect to the vertical direction, and sucking work for sucking a sample in the sample container through the sucking member and the pipette tip, are performed, and in the second mode, may control the driver such that second advancing work for causing the end of the pipette tip to advance to a second position farther upward than the first position in the sample container by causing the sucking member to advance in the axial direction of the pipette tip with the pipette tip, attached to the sucking member, being tilted with respect to the vertical direction, and the sucking work are performed.

A cell picking method according to another aspect of the present invention of sucking cells from a liquid sample in a sample container, may include switching a work mode between a first mode and a second mode, performing first advancing work for bringing an end of the pipette tip into contact with a bottom surface in the sample container by causing the sucking member to advance in an axial direction of the pipette tip with the pipette tip, attached to the sucking member, being tilted with respect to a vertical direction, scanning work for scanning the bottom surface of the sample container toward a first position using the end of the pipette tip by moving the sucking member in a horizontal direction, tilting work for lifting the end of the pipette tip and lowering a base of the pipette tip in the first position by tilting the sucking member further with respect to the vertical direction, and sucking work for sucking a sample in the sample container through the sucking member and the pipette tip, in the first mode, and performing second advancing work for causing the end of the pipette tip to advance to a second position farther upward than the first position in the sample container by causing the sucking member to advance in the axial direction of the pipette tip with the pipette tip, attached to the sucking member, being tilted with respect to the vertical direction, and the sucking work, in the second mode.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 5 is a flowchart showing one example of control of cell-sucking work by the controller of FIG. 4;

DETAILED DESCRIPTION

A cell picking device according to embodiments of the present invention will be described below in detail with reference to the drawings.

(1) Configuration of Cell Picking Device

Figure 1:
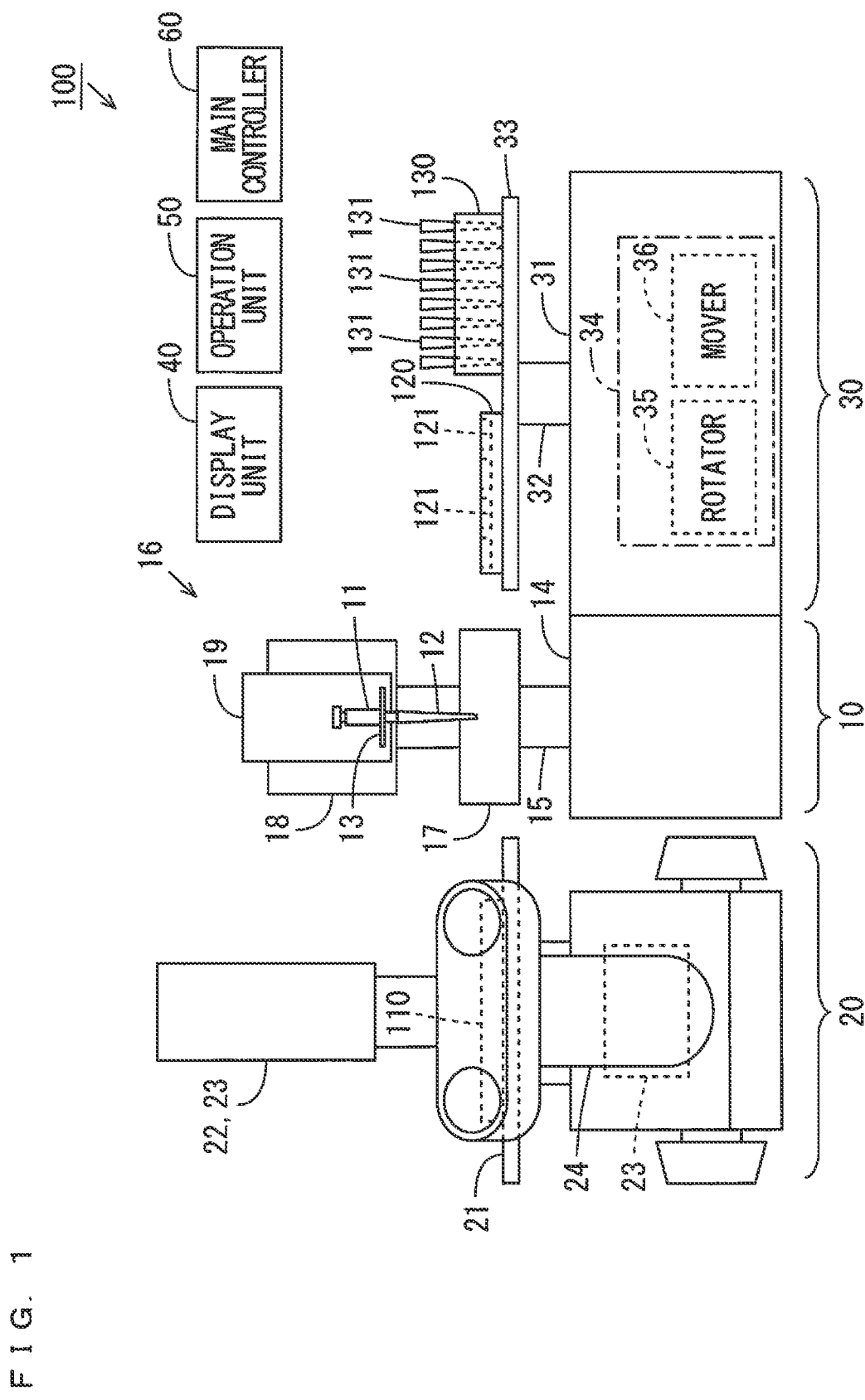
FIG. 1 is a schematic front view showing the configuration of a cell picking device according to one embodiment of the present invention.

FIG. 1 is a schematic front view showing the configuration of the cell picking device according to one embodiment of the present invention. As shown in FIG. 1, the cell picking device 100 includes a suction device 10, an observation device 20, a plate changer 30, a display unit 40, an operation unit 50 and a controller 60. Further, the cell picking device 100 is provided with a sample container 110, a culture plate 120 and a pipette tip rack 130 (hereinafter simply referred to as a rack 130.)

The sample container 110 is a petri plate, for example, and accommodates a liquid sample including cells. Cells to be sucked are included in a sample. The culture plate 120 is a multi-well plate in which a plurality of wells are arranged and used for culturing of cells. The rack 130 holds a plurality of replacement pipette tips 131 (hereinafter simply referred to as replacement tips 131.) In the present example, 24 wells 121 are arranged in 4 rows by 6 columns in the culture plate 120. Further, 96 replacement tips 131 are held while being arranged in 8 rows by 12 columns in the rack 130.

The suction device 10 includes a pipette-shape suction arm 11. Any replacement tip 131 held in the rack 130 is attached to the end of the suction arm 11 (hereinafter, a replacement tip 131 attached to the suction arm 11 is simply referred to as a tip 12.) The suction device 10 can suck cells in the sample container 110 through the tip 12.

In the present example, suction of cells in the sample container 110 into the tip 12 can be switched between a first mode and a second mode. Hereinafter, suction of cells in the sample container 110 into the tip 12 is referred to as cell-sucking work. The first mode is referred to as an adherent cell mode and the second mode is referred to as a suspension cell mode. Details of the cell-sucking work, the adherent cell mode and the suspension cell mode will be described below.

Further, the suction device 10 can discharge cells that have been sucked into the tip 12. Hereinafter, discharging of cells that have been sucked into the tip 12 is referred to as cell-discharging work. The cell-discharging work includes seeding cells in any well 121 of the culture plate 120 and discarding cells to a liquid drain (not shown). Details of the cell-discharging work will be described below.

The observation device 20 includes a stage 21, an illuminator 22, an imager 23 and a microscope 24 and is arranged to be adjacent to the suction device 10. The sample container 110 is placed on the stage 21. The illuminator 22 is arranged above the stage 21. The illuminator 22 includes a light source such as a light emitting diode, for example, and illuminates the sample container 110 placed on the stage 21. The stage 21 is translucent. Alternatively, an opening through which light from the illuminator 22 passes downwardly may be formed in the stage 21.

The imager 23 includes a plurality of lenses, a camera and so on, and picks up an image while magnifying a sample in the sample container 110 illuminated by the illuminator 22. The camera of the imager 23 is arranged above the microscope 24, and the lens is arranged below the stage 21. The microscope 24 includes an eyepiece, a lens-barrel, an objective lens, etc., and is used by a user when a sample in the sample container 110 placed on the stage 21 is magnified for observation.

The plate changer 30 is an optional device arranged to be opposite to the observation device 20 with the suction device 10 provided therebetween and is configured to be attachable to and detachable from the suction device 10. The plate changer 30 includes a base 31, a vertical shaft 32, a platform 33 and a driver 34. The vertical shaft 32 is provided to extend in an up-and-down direction in the base 31. An upper portion of the vertical shaft 32 projects from the base 31. The platform 33 is attached to the upper end of the vertical shaft 32 in a horizontal attitude. The culture plate 120 and the rack 130 are placed on the platform 33.

The driver 34 includes a rotator 35 and a mover 36, and is connected to the platform 33 through the vertical shaft 32 in the base 31. The rotator 35 includes an electric motor, for example, and rotates the platform 33 in a horizontal plane. Thus, the culture plate 120 and the rack 130 placed on the platform 33 are selectively moved to the vicinity of the suction device 10.

Specifically, when the suction device 10 seeds cells into any well 121, the culture plate 120 is moved to the vicinity of the suction device 10. On the other hand, when any replacement tip 131 is attached to the suction arm 11, the rack 130 is moved to the vicinity of the suction device 10. With this configuration, an increase in moving range of the platform 33 is prevented.

The mover 36 includes a stepping motor, for example, and moves the platform 33 in parallel in a horizontal plane. Specifically, the mover 36 moves any well 121 of the culture plate 120 or any replacement tip 131 of the rack 130 to a position accessible by the suction arm 11 (below the suction arm 11, for example). Thus, cells can be seeded from the suction device 10 into a well 121, or a replacement tip 131 can be attached to the suction arm 11.

The display unit 40 includes an LCD (Liquid Crystal Display) panel or an organic EL (Electroluminescence) panel, for example. The display unit 40 displays a plurality of GUIs (Graphical User Interfaces) for receiving selection of work contents of the suction device 10 and the observation device 20 as selection screens. Further, the display unit 40 displays an image and so on that are generated by the imager 23 of the observation device 20. Further, the display unit 40 displays a work screen for receiving an instruction during work of the cell picking device 100.

The operation unit 50 includes a keyboard, a pointing device, etc. As a pointing device, a mouse, a pen device or the like is used. The display unit 40 and the operation unit 50 may be integrally constituted by a touch panel display. The user can operate a button, a pull-down menu or the like in a selection screen or a work screen displayed in the display unit 40 using the operation unit 50.

The controller 60 includes a personal computer, for example, and includes a CPU (Central Processing Unit), a memory and so on. The controller 60 registers a work procedure (hereinafter referred to as a method) including work contents received by the selection screen displayed in the display unit 40. In the present example, a method includes a work procedure from the cell-sucking work to the cell-discharging work. Further, the selection screen includes selection between the adherent cell mode and the suspension cell mode for the cell-sucking work. Further, the controller 60 controls the work of the suction device 10, the observation device 20 and the plate changer 30 in accordance with a registered method.

(2) Configuration of Suction Device

Figure 2:
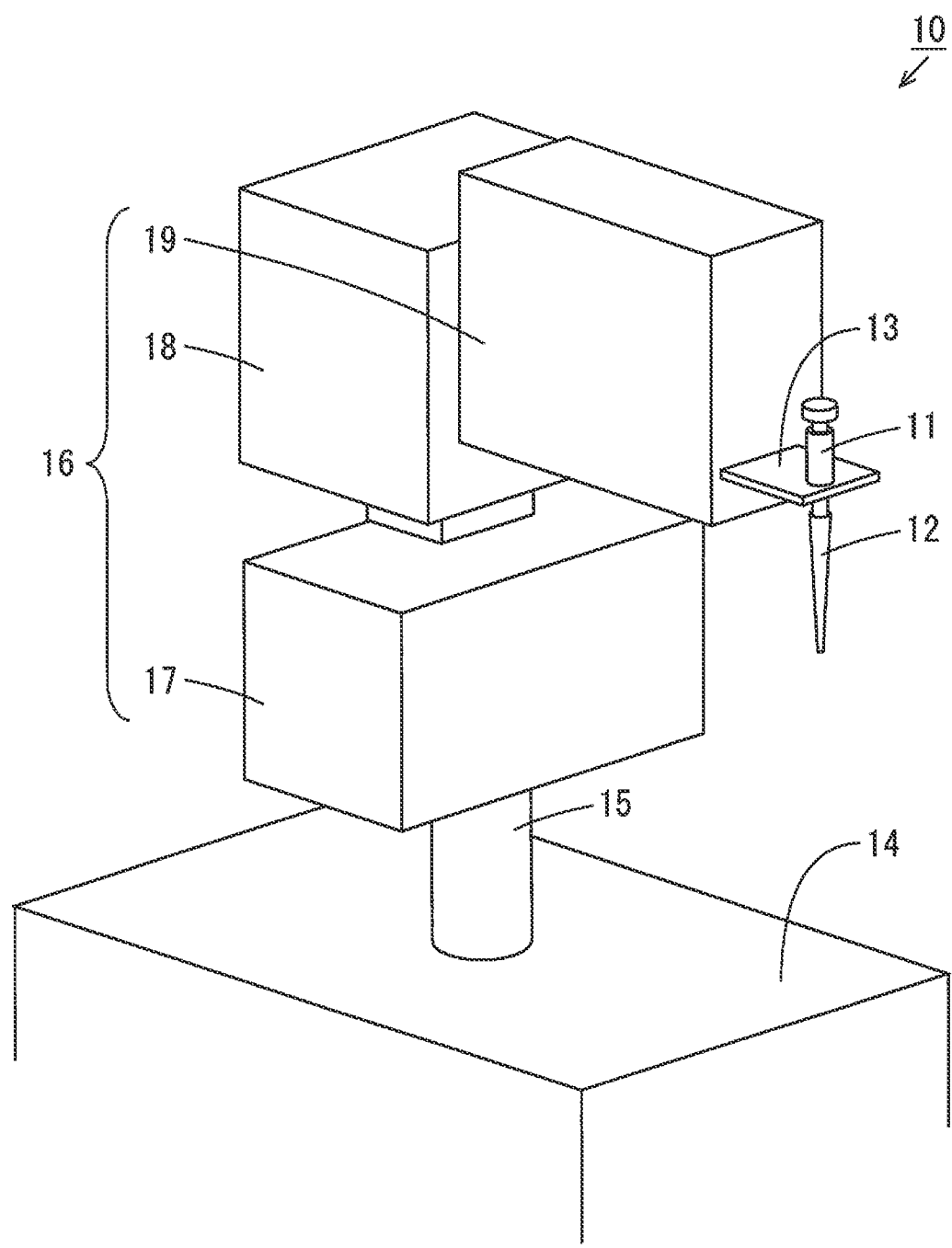
FIG. 2 is a schematic cross sectional view showing the configuration of a suction device of FIG. 1.

FIG. 2 is a schematic perspective view showing the configuration of the suction device 10 of FIG. 1. As shown in FIG. 2, the suction device 10 includes a suction arm 11, a tip 12, a holder 13, a base 14, a vertical shaft 15 and a driver 16. The driver 16 includes rotators 17, 18 and a suction driver 19. The holder 13 holds the suction arm 11 at the suction driver 19. The vertical shaft 15 is provided on the upper surface of the base 14 to extend in the up-and-down direction.

The rotator 17 includes an electric motor, for example, and is attached to the upper end of the vertical shaft 15 to be rotatable in a horizontal plane. The rotator 18 includes an electric motor, for example, and is attached to the rotator 17 to be rotatable in a vertical plane. The rotator 17 and the rotator 18 may be constituted by a single electric motor, etc. which is rotatable in the horizontal plane and the vertical plane.

The suction driver 19 includes a stepping motor, for example, and is attached to the rotator 18 to be advanceable and retreatable in a predetermined direction (an up-and-down direction in a case where the rotator 18 is not rotating in the vertical plane). Further, the suction driver 19 includes a suction mechanism and is configured to be capable of sucking and discharging cells from the suction arm 11.

In the cell-sucking work, the rotator 17 is rotated in a horizontal plane such that the suction arm 11 and the tip 12 of the suction device 10 are directed toward the observation device 20. The rotator 18 is rotated in a vertical plane such that the tip 12 attached to the suction arm 11 is tilted by a predetermined angle. The position of the tip 12 at this time is referred to as a standby position.

In seeding of cells in a well 121 of the cell-discharging work, the rotator 17 is rotated in a horizontal plane such that the suction arm 11 and the tip 12 of the suction device 10 are directed toward the plate changer 30. Further, the rotator 35 is rotated in a horizontal plane such that the culture plate 120 is located closer to the suction device 10 than the rack 130. Further, the mover 36 moves in parallel with a horizontal plane such that any well 121 of the culture plate 120 is located below the tip 12 attached to the suction arm 11.

(3) Method Creation

Figure 3:
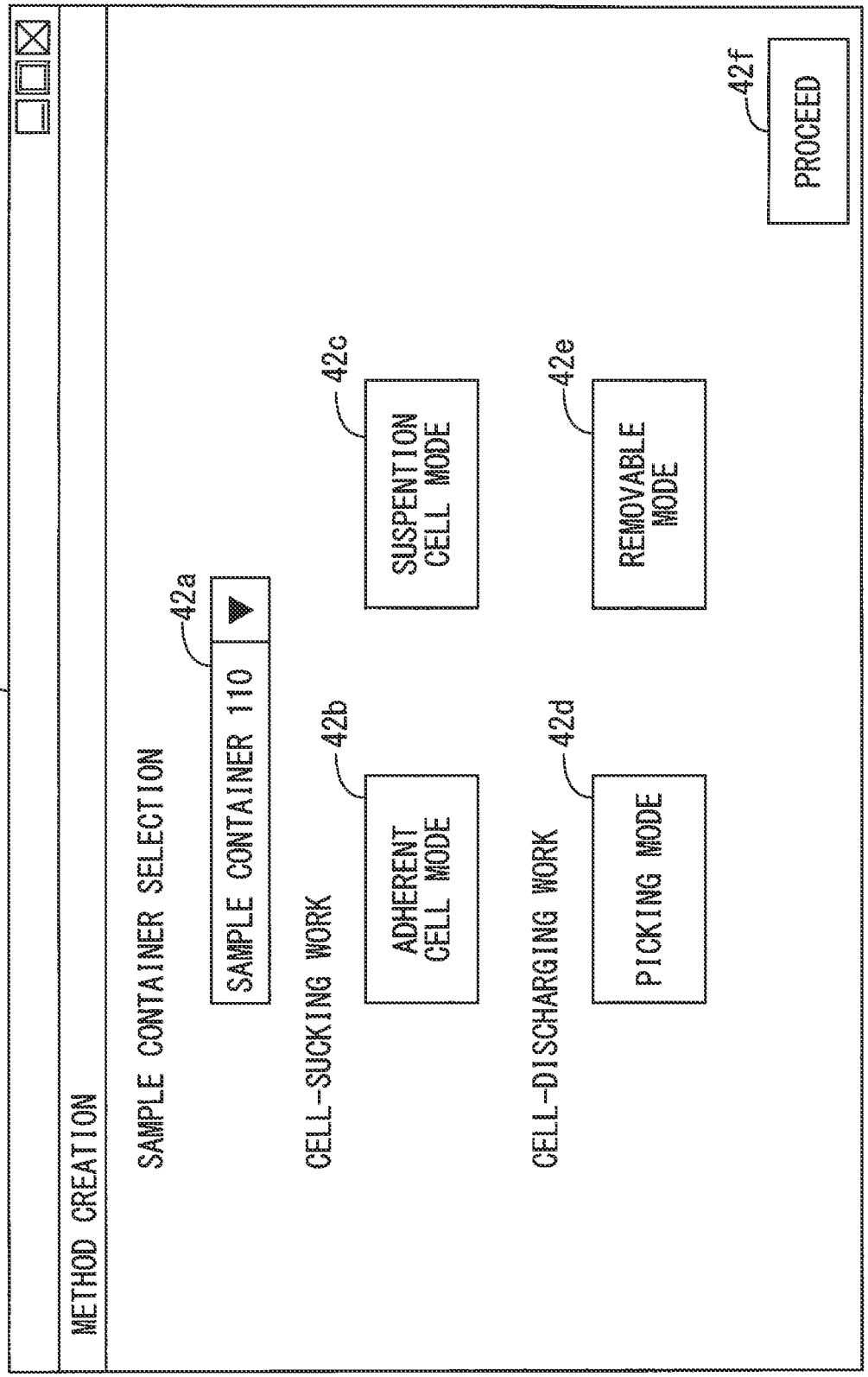
FIG. 3 is a schematic diagram showing one example of a selection screen displayed in a display unit of FIG. 1 when a method is created.

FIG. 3 is a schematic diagram showing one example of a selection screen to be displayed in the display unit 40 of FIG. 1 during method creation. In FIG. 3, a work mode selection screen 42 is shown.

As shown in FIG. 3, in the work mode selection screen 42, a pull-down menu 42a, an adherent cell mode button 52b, a suspension cell mode button 42c, a picking mode button 42d, a removal mode button 42e and a proceed button 42f are displayed.

The user selects the type of the sample container 110 of FIG. 1 from the sample containers displayed in the pull-down menu 42a. In the present example, the sample container 110 is selected as shown in FIG. 3. In the present example, in regard to the sample containers displayed in the pull-down menu 42a, registration information corresponding to the sample containers 110 is stored in advance in a memory of the controller 60. The registration information corresponding to the sample containers 110 includes a position of the end of the tip 12 at which first advancing work and second advancing work, described below, stop.

The controller 60 controls the work of the suction device 10 based on registration information corresponding to a selected sample container.

In regard to the cell-sucking work, one of the adherent cell mode button 42b and the suspension cell mode button 42c is selected in accordance with the state of cells in a sample of the sample container 110. In a case where cells in the sample of the sample container 110 adhere to the bottom surface in the sample container 110, the user selects the adherent cell mode button 42b. Further, in a case where cells are in suspension in the sample of the sample container 110, the user selects the suspension cell mode button 42c. Thus, the work modes for the cell-sucking work of the suction device 10 are switched.

In regard to the cell-discharging work, one of the picking mode button 42d and the removal mode button 42e is selected. Thus, the work modes for the cell-discharging work of the suction device 10 are switched. In a case where the user selects the picking mode button 42d, the cell-discharging work is performed in the picking mode. In a case where the user selects the removal mode button 42e, the cell-discharging work is performed in the removal mode.

In the picking mode, cells that have been sucked into the tip 12 are seeded in a well 121 of the culture plate 120. In the removal mode, cells that have been sucked into the tip 12 are discarded to the liquid drain (not shown). Thus, cells are moved from the sample container 110. When the proceed button 42f is operated, selection is confirmed in the work mode selection screen 42. Subsequently, the work procedure is set sequentially, so that a method representing the work procedure for the cell-sucking work and the cell-discharging work is created. The created method is stored in a storage medium such as a memory.

(4) Functional Configuration of Controller 60

Figure 4:
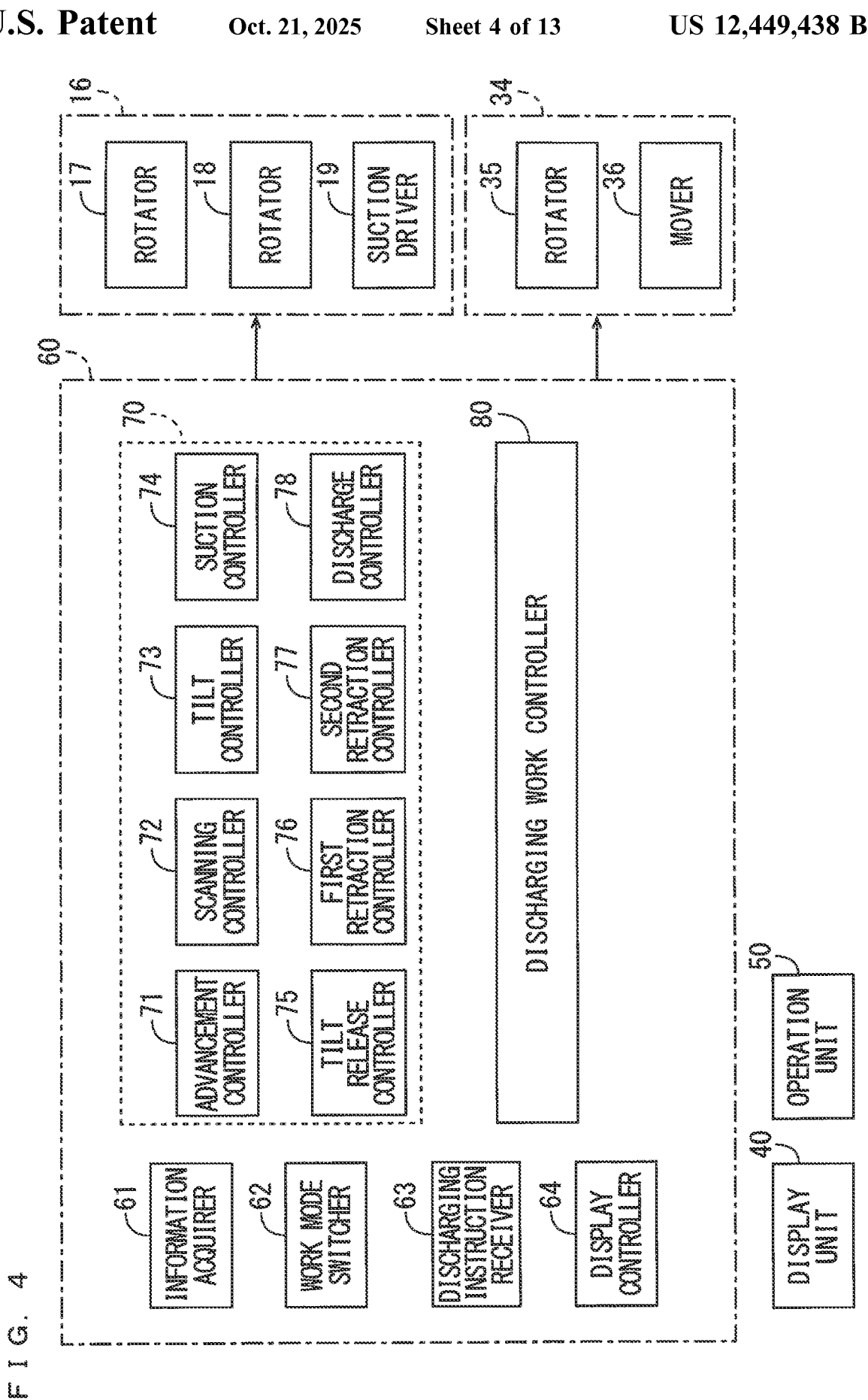
FIG. 4 is a block diagram showing the functional configuration of a controller.

FIG. 4 is a block diagram showing the functional configuration of the controller 60. As shown in FIG. 4, the controller 60 includes an information acquirer 61, a work mode switcher 62, a discharging instruction receiver 63, a display controller 64, a sucking work controller 70 and a discharging work controller 80 as functions. Functions of the controller 60 are implemented by execution of a cell accommodating program stored in the memory by the CPU of the controller 60. Part or all of the functions of the controller 60 may be implemented by hardware such as an electronic circuit.

The information acquirer 61 acquires registration information from the memory. The work mode switcher 62 switches the work mode for the cell-sucking work to the adherent cell mode or the suspension cell mode that is selected in accordance with a method. Further, the work mode switcher 62 switches the work mode for the cell-sucking work to the adherent cell mode or the suspension cell mode that is selected by the user.

The discharging instruction receiver 63 receives an instruction for discharging cells in the tip 12 into the sample container 110 from the method. Further, the discharging instruction receiver 63 receives an instruction for discharging cells in the tip 12 into the sample container 110 based on a user's operation with use of the operation unit 50. The display controller 64 displays a plurality of GUIs (Graphical User Interfaces) for receiving selection of the work contents of the suction device 10 and the observation device 20 in the display unit 40 as selection screens. Further, the display controller 64 displays an image or the like generated by the imager 23 of the observation device 20 in the display unit 40.

Further, the display controller 64 displays a work screen for receiving an instruction during work of the cell picking device 100 in the display unit 40. Further, the display controller 64 controls the work of the work mode switcher 62 based on an instruction from the operation unit 50 provided by the user.

The sucking work controller 70 causes the suction device 10 to perform the cell-sucking work. The sucking work controller 70 includes an advancement controller 71, a scanning controller 72, a tilting controller 73, a suction controller 74, a tilt release controller 75, a first retraction controller 76, a second retraction controller 77 and a discharge controller 78.

The advancement controller 71 controls the rotators 17, 18 and the suction driver 19 such that the suction arm 11 advances in the axial direction of the tip 12 with the tip 12 attached to the suction arm 11 being tilted with respect to the vertical direction. Thus, contact of the end of the tip 12 with the bottom surface in the sample container 110 is referred to as first advancing work. Similarly, advancement of the end of the tip 12 to a position farther upward than the bottom surface in the sample container 110 is referred to as second advancing work.

The scanning controller 72 controls the rotator 17 such that the suction arm 11 moves in a horizontal direction. Thus, the end of the tip 12 scans the bottom surface in the sample container 110 toward the substantially center of the sample container 110.

In the present example, the suction arm 11 moves in an arc shape in a horizontal plane. Hereinafter, this work is referred to as scanning work.

The tilting controller 73 controls the rotator 18 such that the suction arm 11 that has been tilted by the advancement controller 71 is further tilted with respect to the vertical direction. Thus, the end of the tip 12 located at substantially center of the sample container 110 is lifted, and the base of the tip 12 is lowered. Hereinafter, this work is referred to as tilting work.

The suction controller 74 controls the suction driver 19 such that the suction arm 11 and the tip 12 suck a sample in the sample container 110 into the tip 12. Hereinafter, this work is referred to as sucking work.

The tilt release controller 75 controls the rotator 18 such that the tilt angle of the suction arm 11 that has been tilted by the tilting work of the tilting controller 73 returns to the angle prior to the tilting work. Hereinafter, this work is referred to as tilt releasing work.

The first retraction controller 76 controls the suction driver 19 such that the suction arm 11 retracts in the axial direction at a first speed until the end of the tip 12 reaches a predetermined height. Hereinafter, this work is referred to as first retracting work. In the present example, the predetermined height is the height of a liquid surface of sample. Further, the position of the end of the tip 12 may be determined based on the number of pulses of the stepping motor of the suction driver 19.

The second retraction controller 77 controls the suction driver 19 such that the suction arm 11 retracts in the axial direction at a second speed larger than the first speed after the end of the tip 12 reaches the height of the liquid surface of sample. Hereinafter, this work is referred to as second retracting work. A position at which the first retracting work and the second retracting work are switched is stored in advance.

The discharge controller 78 controls the suction driver 19 such that the tip 12 discharges cells into the sample container 110. Hereinafter, this work is referred to as cell-returning work. Details of the cell-returning work will be described below. The discharging work controller 80 causes the suction device 10 and the plate changer 30 to perform the cell-discharging work.

(5) Cell-Sucking Work (5-1) The diagram of FIG. 5 in regard to the control of the cell-sucking work is a flowchart showing one example of control of the cell-sucking work by the controller 60 of FIG. 4. The cell-sucking work is performed in accordance with a work procedure of a method.

First, the information acquirer 61 acquires registration information corresponding to the sample container 110 (step S1). The work mode switcher 62 determines whether the adherent cell mode is selected in the method (step S2). The work mode switcher 62 may determine whether the adherent cell mode has been selected by a user's operation with use of the operation unit 50. In a case where the adherent cell mode is selected, the work mode switcher 62 switches the work mode to the adherent cell mode (step S3). At this time, the sucking work controller 70 controls the driver 16 such that the suction device 10 performs the cell-sucking work in the adherent cell mode (step S4). The cell-sucking work of the suction device 10 in the adherent cell mode will be described below.

In the step S2 of FIG. 5, in a case where the adherent cell mode is not selected, the work mode switcher 62 switches the work mode to the suspension cell mode (step S5). At this time, the sucking work controller 70 controls the driver 16 such that the suction device 10 performs the cell-sucking work in the suspension cell mode (step S6). The cell-sucking work of the suction device 10 in the suspension cell mode will be described below.

After the cell-sucking work in the adherent cell mode in the step S4 or the cell-sucking work in the suspension cell mode in the step S6 in FIG. 5 ends, the cell-discharging work is performed by control of the discharging work controller 80.

(5-2) Adherent Cell Mode

Figure 6:
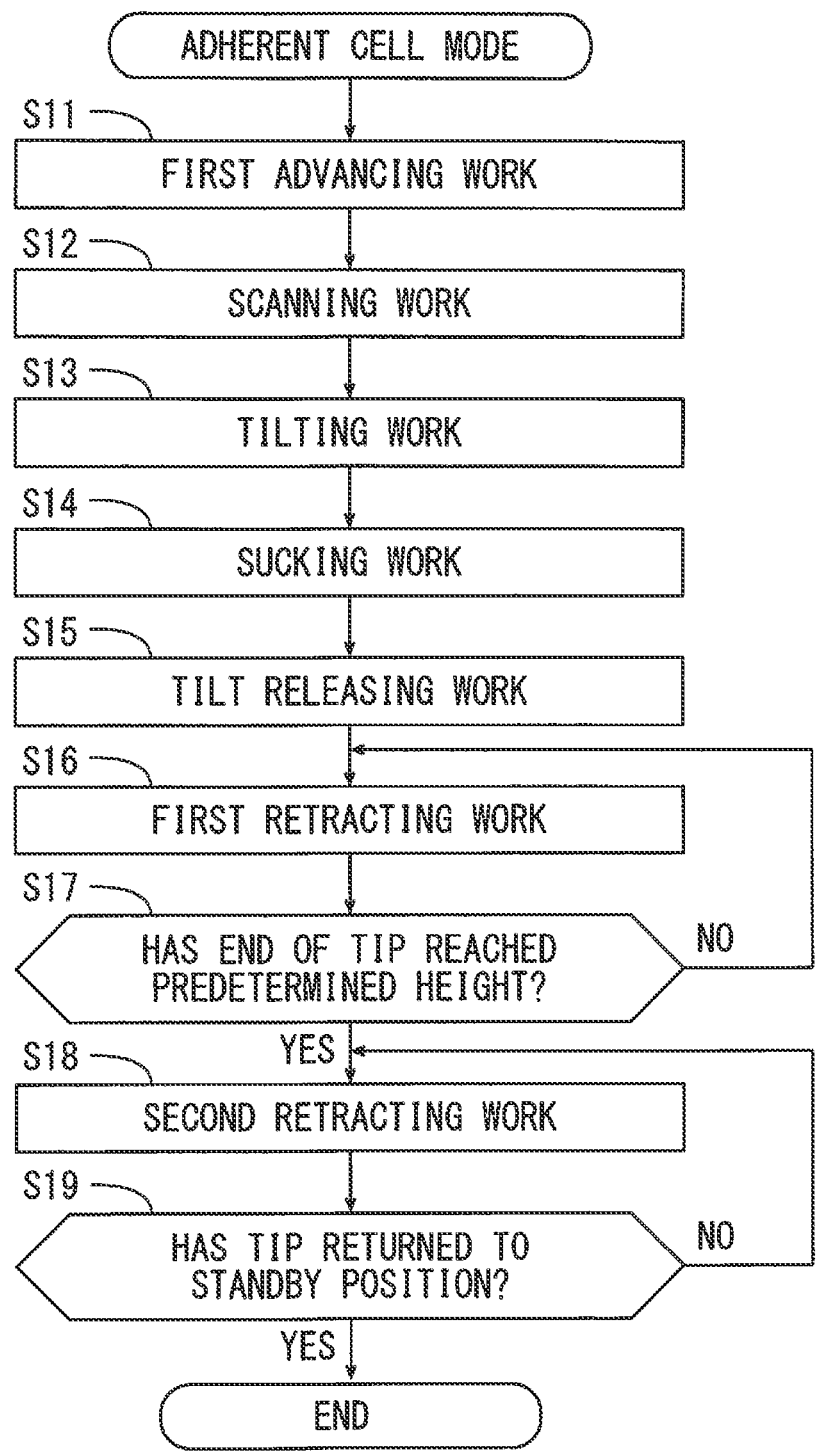
FIG. 6 is a flowchart showing one example of control in an adherent cell mode in FIG. 5.
Figure 8:
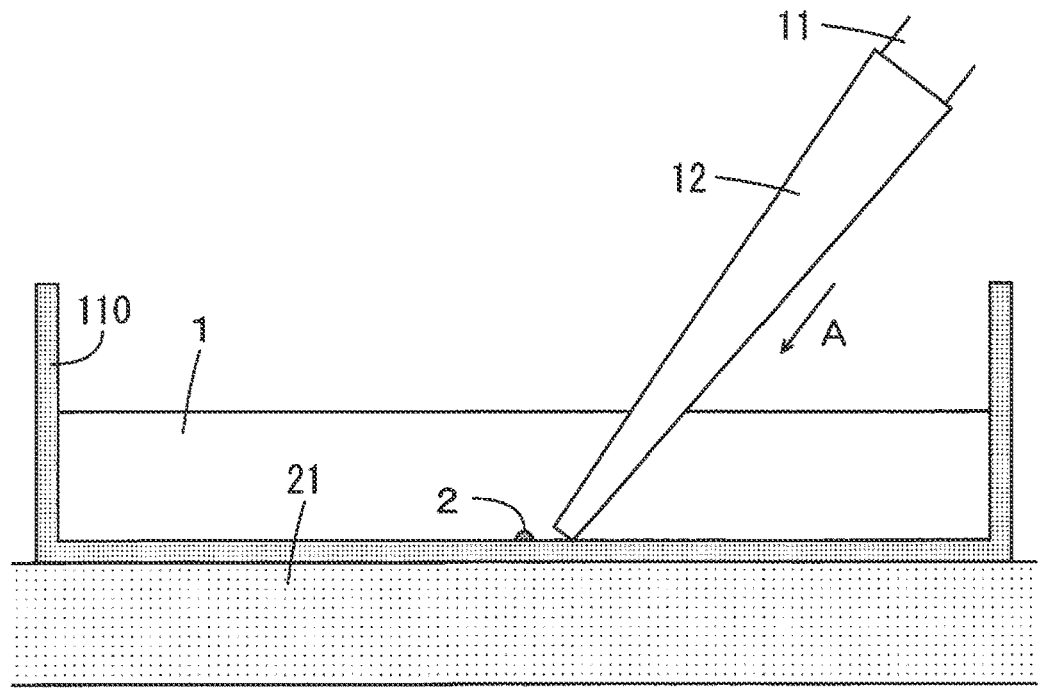
FIG. 8 is a diagram for explaining the cell-sucking work of the suction device in the adherent cell mode.
Figure 9:
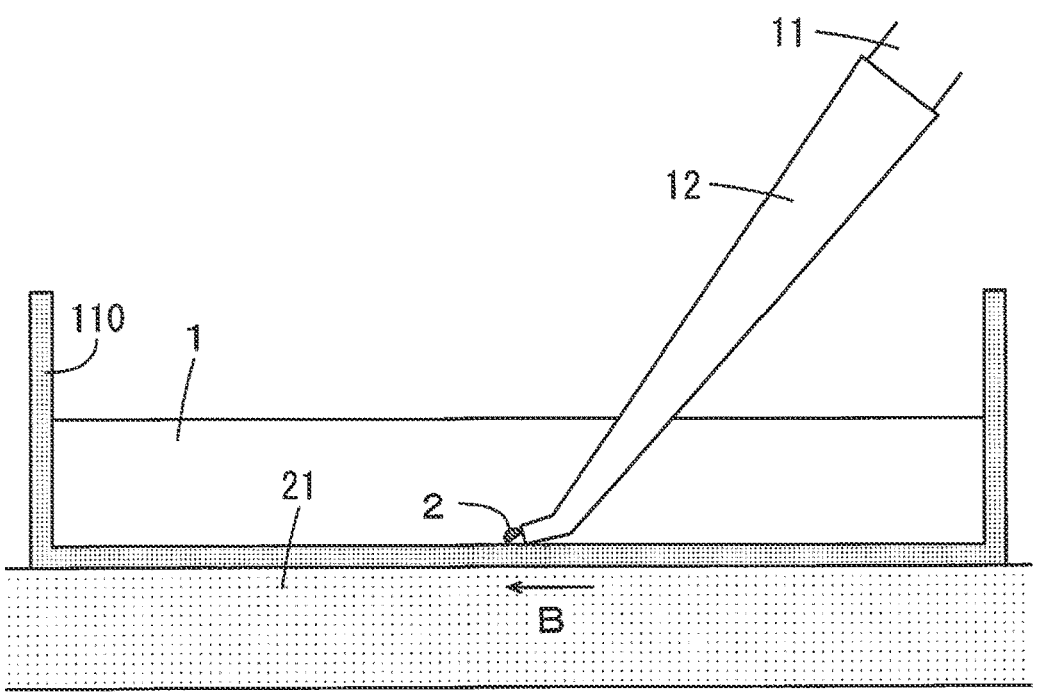
FIG. 9 is a diagram for explaining the cell-sucking work of the suction device in the adherent cell mode.
Figure 10:
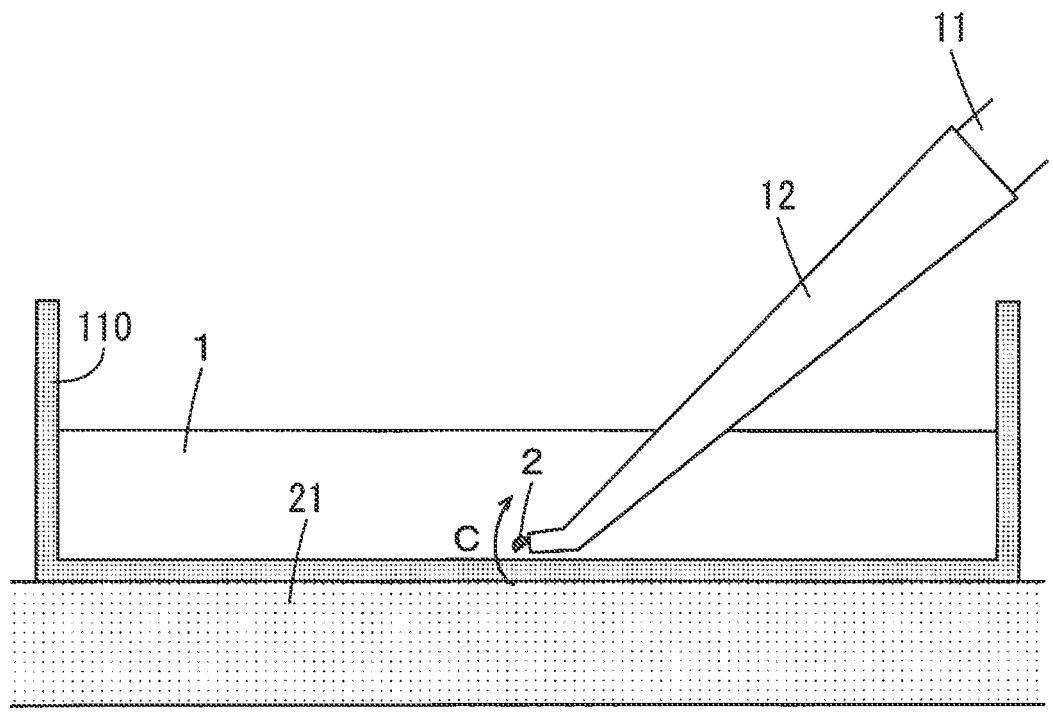
FIG. 10 is a diagram for explaining the cell-sucking work of the suction device in the adherent cell mode.

FIG. 6 is a flowchart showing one example of control in the adherent cell mode in FIG. 5. FIGS. 8 to 14 are schematic diagrams for explaining the cell-sucking work of the suction device 10 in the adherent cell mode. As shown in FIG. 8, cells adhere to the bottom surface of the sample container 110 at the substantially center portion of the sample container 110.

First, the advancement controller 71 controls the suction driver 19 such that the first advancing work is performed (step S11 of FIG. 6). Thus, as indicated by the arrow A in FIG. 8, the tip 12 advances in the axial direction (an end direction). In this case, the end of the tip 12 comes into contact with the bottom surface of the sample container 110. At this time, the end of the tip 12 may be bent slightly elastically by the pressure of the end of the tip 12 against the bottom surface of the sample container 110 (see FIG. 9). Advancement of the tip 12 is stopped based on the registration information acquired by the information acquirer 61. Thus, in the adherent cell mode, the end of the tip 12 is prevented from being damaged.

Subsequently, the scanning controller 72 controls the rotator 17 such that the scanning work is performed (step S12). Thus, as indicated by the arrow B in FIG. 9, the end of the tip 12 scans the bottom surface of the sample container 110 toward the center portion of the sample container 110. As a result, the end of the tip 12 comes into contact with cells, and the cells adhering to the bottom surface of the sample container 110 are separated. Thereafter, the tilting controller 73 controls the rotator 18 such that the tilting work is performed (step S13). Thus, as indicated by the arrow C in FIG. 10, the tip 12 performs the tilting work. As a result, cells are stripped from the bottom surface of the sample container 110.

Figure 11:
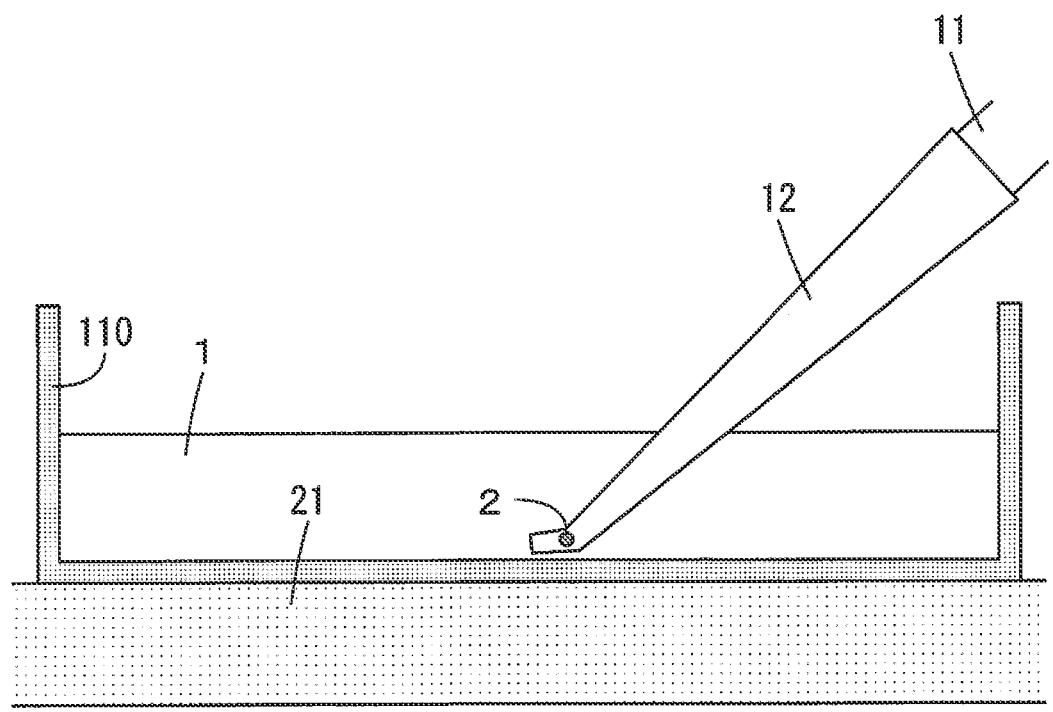
FIG. 11 is a diagram for explaining the cell-sucking work of the suction device in the adherent cell mode.
Figure 12:
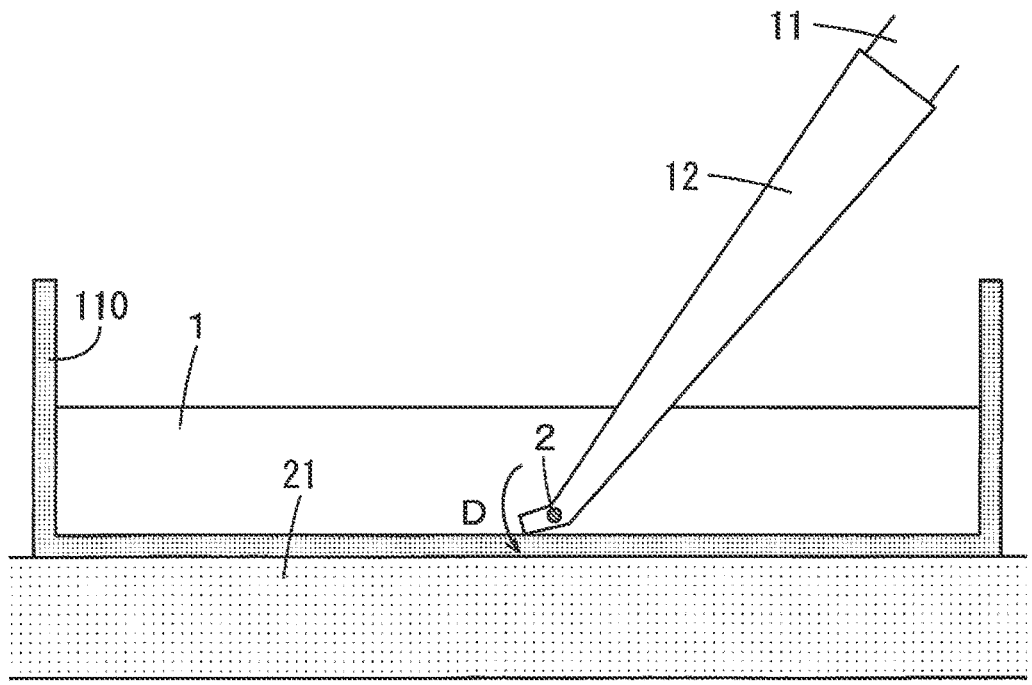
FIG. 12 is a diagram for explaining the cell-sucking work of the suction device in the adherent cell mode.
Figure 13:
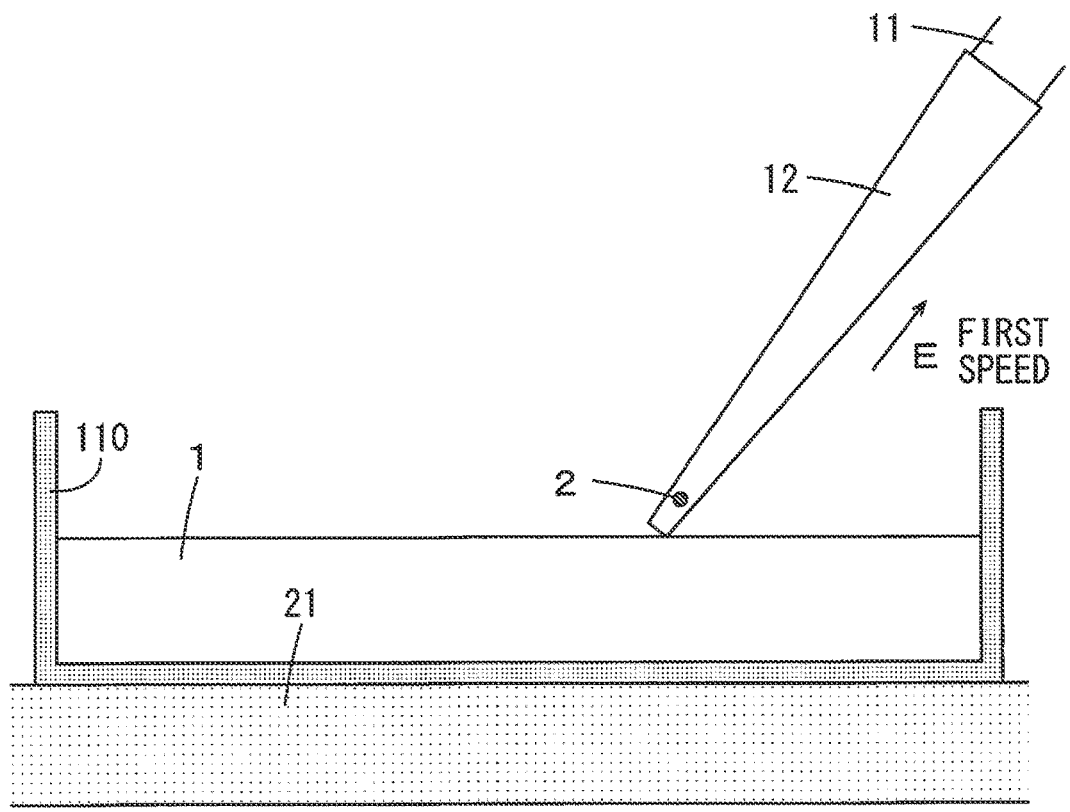
FIG. 13 is a diagram for explaining the cell-sucking work of the suction device in the adherent cell mode.
Figure 14:
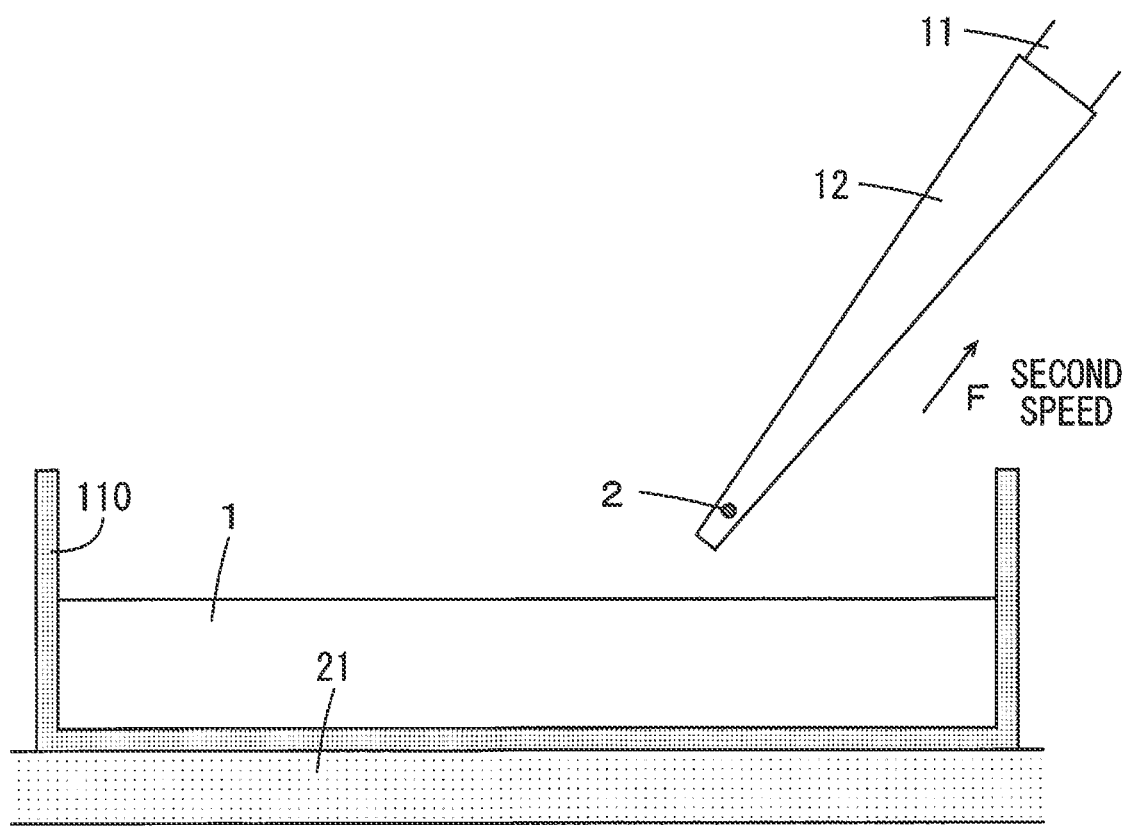
FIG. 14 is a diagram for explaining the cell-sucking work of the suction device in the adherent cell mode.

Next, the suction controller 74 controls the suction driver 19 such that the sucking work is performed (step S14). Thus, as shown in FIG. 11, cells are sucked into the tip 12. In the present example, the above-mentioned suction is started at a point in time that is later than the start of the tilting work and earlier than the stop of the tilting work, and suction is stopped after a predetermined period of time elapses from a point in time at which the tilting work is stopped. In this case, cells are sucked efficiently. The timing for suction is not limited to the above-mentioned example. Suction may be started at a point in time later than the stop of the tilting work, or suction may be started at the same time as the start of the tilting work. Alternatively, suction may end at a point in time earlier than the end of the tilting work, or suction may be stopped at the same time as the stop of the tilting work.

After the sucking work ends, the tilt release controller 75 controls the rotator 18 such that the tilt releasing work is performed (step S15). Thus, as indicated by the arrow D in FIG. 12, the attitude of the tip 12 returns to the attitude prior to the tilting work.

The work of FIGS. 8 to 12 (the steps S11 to S15) is repeated, so that cells can be sucked successively and easily. In the successive suction of cells, the rotator 17 may be slightly rotated in a horizontal plane after the work of FIG. 12. In this case, cells located at a position slightly different from the previous suction position can be sucked. After the end of the sucking work, the first retraction controller 76 controls the suction driver 19 such that the first retracting work is performed (step S16). Thus, as indicated by the arrow E in FIG. 13, the tip 12 retracts at the first speed (step S16). In this case, retraction of the tip 12 at the first speed continues until the end of the tip 12 reaches the height of the liquid surface of sample (step S17).

With the first retracting work, the speed at which the tip 12 is lifted is relatively small until the tip 12 is pulled out of a sample. Thus, even in a case where adhering to the sample due to surface tension or the like, sucked cells are prevented from falling into the sample again.

After the end of the tip 12 reaches the height of the liquid surface of sample, the second retraction controller 77 controls the suction driver 19 such that the second retracting work is performed (step S18). Thus, as indicated by the arrow F in FIG. 14, the tip 12 further retracts at the second speed. In this case, retraction of the tip 12 at the second speed continues until the tip 12 returns to the standby position (step S19). When the tip 12 returns to the standby position, the cell-sucking work ends.

With the second retracting work, because the retraction speed of the tip 12 is larger than the retraction speed of the first retracting work after the tip 12 is pulled out of the sample, the tip 12 can return to the standby position in a short period of time. Thus, operability of the cell picking device 100 is improved. Further, cells can be prevented from being exposed to the atmosphere for a long period of time.

(5-3) Suspension Cell Mode

Figure 7:
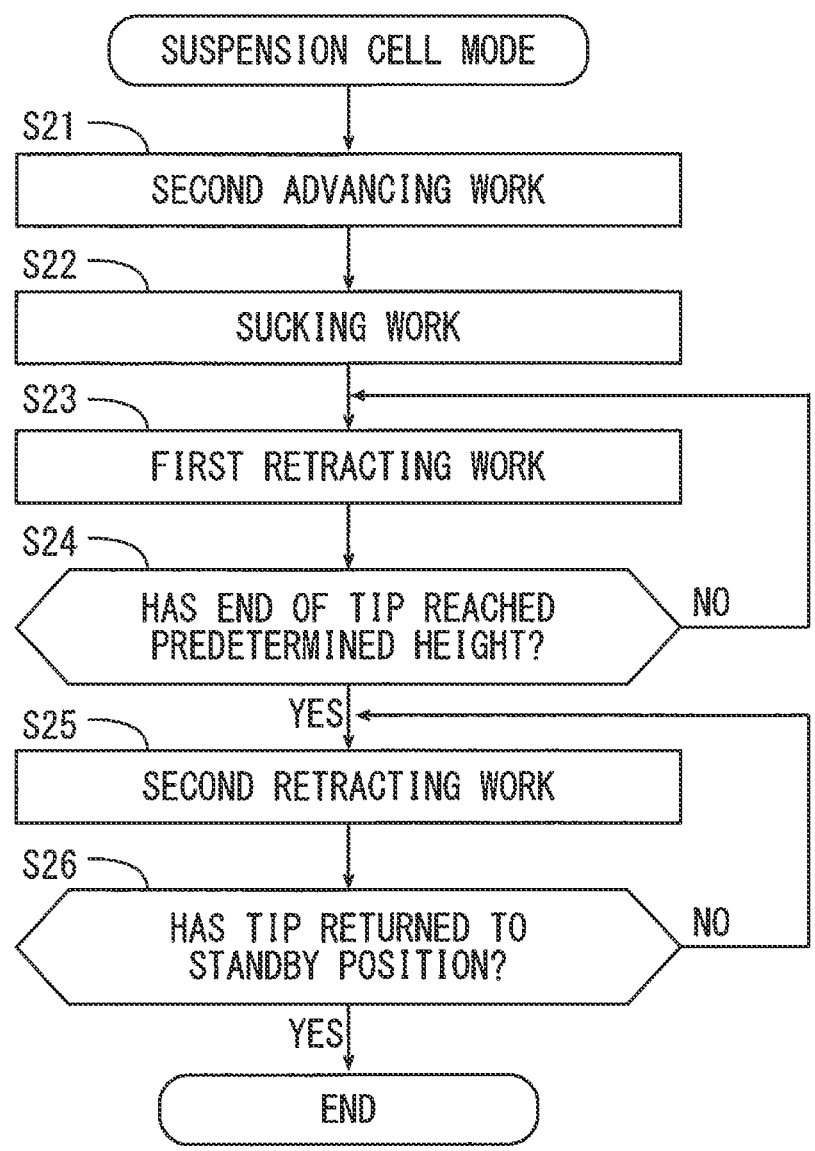
FIG. 7 is a flowchart showing one example of control in a suspension cell mode in FIG. 5.
Figure 15:
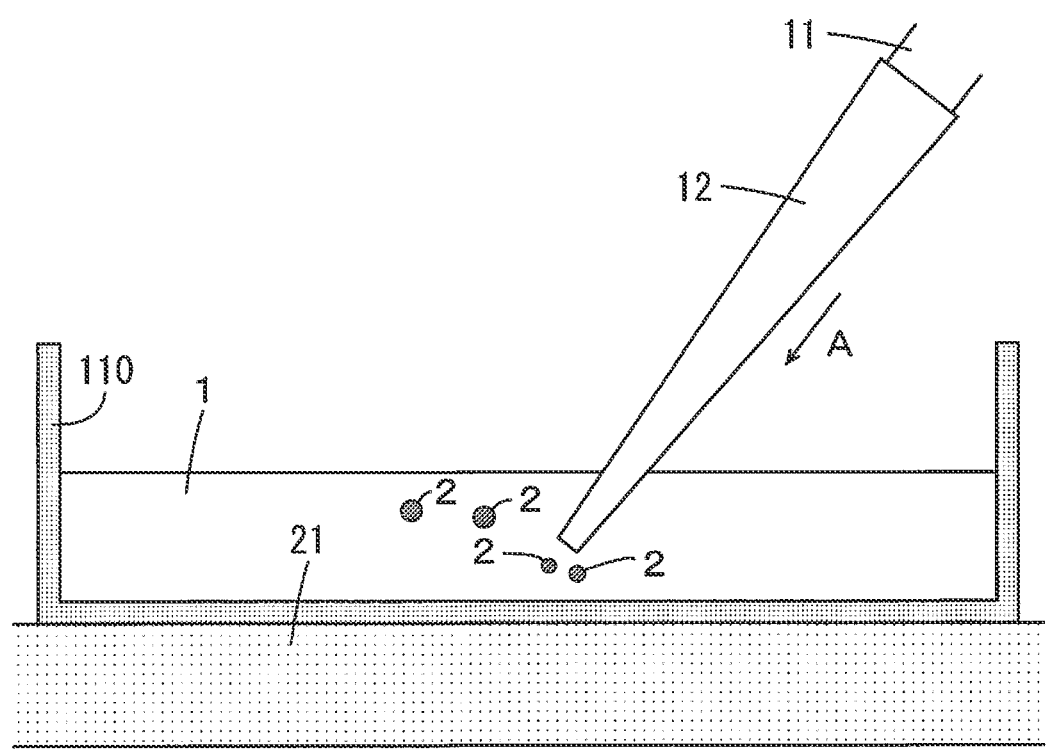
FIG. 15 is a diagram for explaining the cell-sucking work of the suction device in the suspension cell mode.

FIG. 7 is a flowchart showing one example of control in the suspension cell mode in FIG. 5. FIG. 15 is a schematic diagram for explaining the cell-sucking work of the suction device 10 in the suspension cell mode. The suspension cell mode is different from the adherent cell mode in following points.

As shown in FIG. 15, cells are in suspension in a sample of the sample container 110. First, the advancement controller 71 controls the suction driver 19 such that the second advancing work is performed (step S21 of FIG. 7). Thus, as indicated by the arrow A in FIG. 15, the tip 12 advances in the axial direction (the end direction). In this case, the end of the tip 12 is located between the liquid surface of sample in the sample container 110 and the bottom surface of the sample container 110. Because the advancement of the tip 12 is stopped based on the registration information acquired by the information acquirer 61, the contact between the end of the tip 12 and the bottom surface of the sample container 110 is prevented in the suspension cell mode.

Thereafter, the suction controller 74 controls the suction driver 19 such that the sucking work is performed (step S22). Thus, cells in suspension in the sample in the sample container 110 are sucked into the tip 12. The subsequent work from the steps S23 to S26 is similar to the work of the steps S16 to S19 shown in FIG. 6.

(5-4) Sucked-Cell Confirmation

In the adherent cell mode of the cell-sucking work, sucked cells may be confirmed by the user between the step S14 and the step S15 of FIG. 6. Similarly, in the suspension cell mode of the cell-sucking work, the sucked cells may be confirmed by the user between the step S22 and the step S23 of FIG. 7. Sucked cells are confirmed for confirmation whether cells have been sucked into the tip 12.

Figure 16:
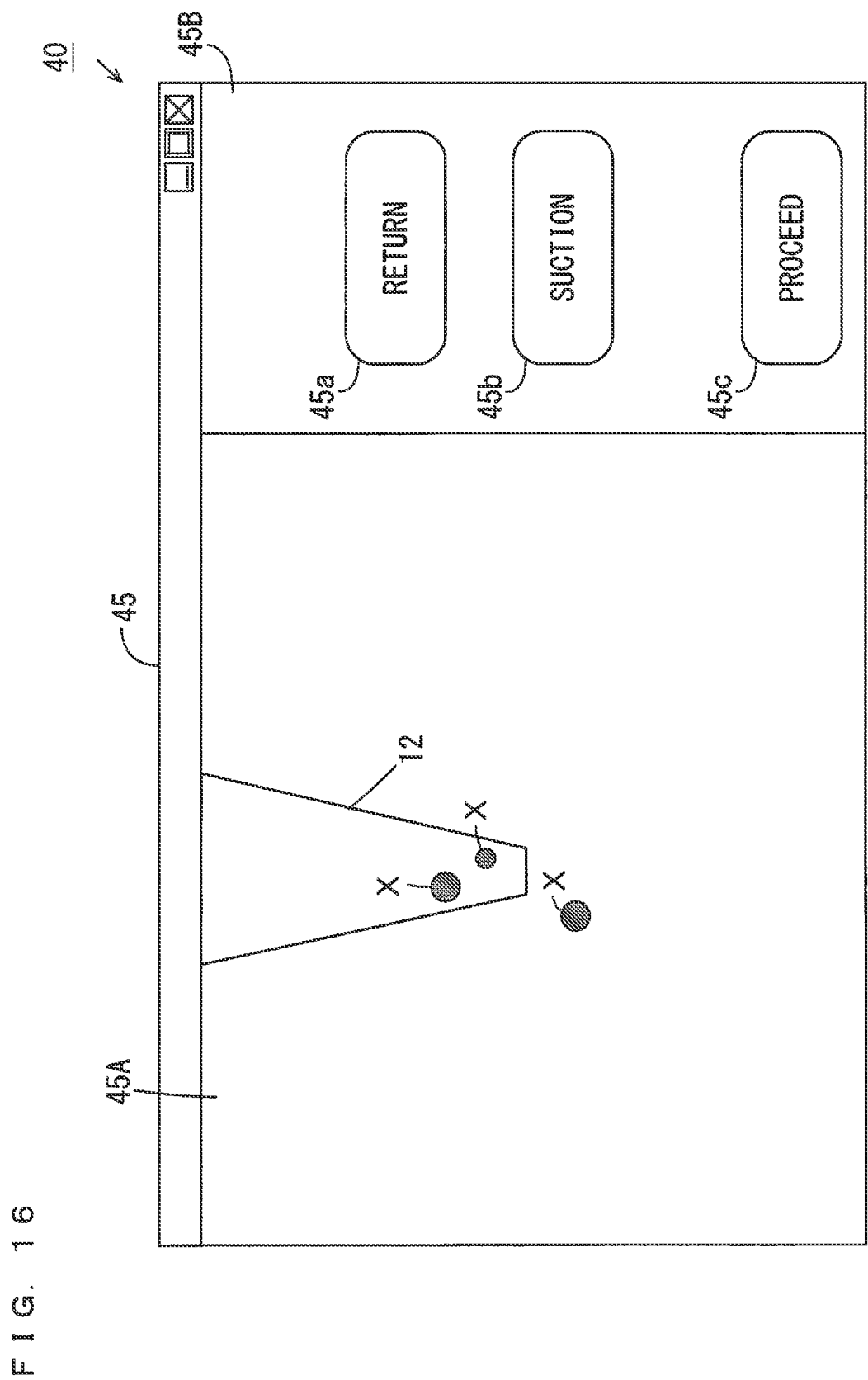
FIG. 16 is one example of a screen displayed in a display unit for confirmation of sucked-cells.

FIG. 16 is a schematic diagram showing one example of a screen displayed in the display unit 40 for sucked-cell confirmation. Hereinafter, the screen of FIG. 16 is referred to as a sucked-cell confirmation screen 45. The sucked-cell confirmation screen 45 includes an image display region 45A and a GUI display region 45B. In the image display region 45A, an image including the end of the tip 12 and cells X in the sample container 110 is displayed in real time. The image displayed in the image display region 45A is generated by the imager 23 of the observation device 20.

The GUI display region 45B includes a return button 45*a*, a suction button 45*b* and a proceed button 45*c*. In a case where the return button 45*a* is operated, the cell-returning work is performed. Thus, cells accommodated in the tip 12 are discharged into the sample container 110. In a case where the suction button 45*b* is operated, a sample in the sample container 110 is sucked. When the proceed button 45*c* is operated, the cell-discharging work of the suction device 10 is started.

(6) Effects of Embodiment

With the cell picking device 100 of the present embodiment, the work mode of the driver 16 can be selectively switched to the adherent cell mode or the suspension cell mode. In the adherent cell mode, with the end of the tip 12 being in contact with the bottom surface in the sample container 110, the end of the tip 12 scans the bottom surface of the sample container 110 in a horizontal direction. Thus, cells adhering to the bottom surface in the sample container 110 are stripped. Further, in the suspension cell mode, a sample is sucked with the end of the tip 12 located between the bottom surface in the sample container 110 and the liquid surface of sample. Thus, cells in suspension in the liquid sample in the sample container 110 are sucked. As a result, the work mode of the driver 16 is switched in accordance with the state of cells in the sample, so that cells are sucked efficiently.

Further, in the adherent cell mode and the suspension cell mode, in a case where the number of cells sucked into the tip 12 is not a desired number, it is not necessary to stop the suction and wait until cells naturally fall from the tip 12. Thus, cells in the tip 12 can be immediately returned into the sample container 110 from the tip 12 by an instruction provided by the user. Therefore, a period of time required for the suction device 10 to perform the sucking work again is shortened.

(7) Other Embodiments

While being the height from the bottom surface of the sample container 110 to the liquid surface in the above-mentioned embodiment, the predetermined height for the first retracting work and the second retracting work of the cell-sucking work may be set to any height in the sample container 110 based on the depth of the sample container 110, for example.

In the above-mentioned embodiment, the first retracting work is performed at the first speed and the second retracting work is performed at the second speed larger than the first speed in the cell-sucking work. However, the first retracting work and the second retracting work may be performed at an equal speed.

While being performed in the adherent cell mode in the above-mentioned embodiment, the tilt releasing work does not have to be performed in a case where cells are not sucked successively, for example.

(8) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the suction arm 11 is an example of a sucking member, the information acquirer 61 is an example of a registration information receiver, and the sucking work controller 70 is an example of a controller.

(9) Aspects

It is understood by those skilled in the art that the plurality of above-mentioned illustrative embodiments are specific examples of the below-mentioned aspects.

(Item 1) A cell picking device according to one aspect for sucking cells from a liquid sample in a sample container, may include a sucking member to which a pipette tip is attachable, a driver that moves the sucking member and performs suction through the sucking member and the pipette tip, a work mode switcher that switches a work mode of the driver between a first mode and a second mode, and a controller that controls the driver, wherein the controller, in the first mode, may control the driver such that first advancing work for bringing an end of the pipette tip into contact with a bottom surface in the sample container by causing the sucking member to advance in an axial direction of the pipette tip with the pipette tip, attached to the sucking member, being tilted with respect to a vertical direction, scanning work for scanning the bottom surface of the sample container toward a first position using the end of the pipette tip by moving the sucking member in a horizontal direction, tilting work for lifting the end of the pipette tip and lowering a base of the pipette tip in the first position by tilting the sucking member further with respect to the vertical direction, and sucking work for sucking a sample in the sample container through the sucking member and the pipette tip, are performed, and in the second mode, may control the driver such that second advancing work for causing the end of the pipette tip to advance to a second position farther upward than the first position in the sample container by causing the sucking member to advance in the axial direction of the pipette tip with the pipette tip, attached to the sucking member, being tilted with respect to the vertical direction, and the sucking work are performed.

With the cell picking device according to item 1, the work mode of the driver can be switched between the first mode and the second mode. In the first mode, with the tip of the pipette tip being in contact with the bottom surface in the sample container, the pipette tip scans the bottom surface of the sample container in a horizontal direction and a sample is sucked. Thus, cells adhering to the bottom surface in the sample container are scraped by the end of the pipette tip. Further, in the second mode, a sample is sucked with the end of the pipette tip located between the bottom surface in the sample container and the liquid surface of sample. Thus, cells in suspension in the liquid sample in the sample container are sucked. As a result, it is possible to efficiently suck cells in the sample by switching the work mode of the driver in accordance with a state of cells in the sample.

(Item 2) The cell picking device according to item 1, may further include a discharging instruction receiver that receives an instruction for performing first discharging work for discharging a sample that has been sucked into the pipette tip into the sample container in the first mode or the second mode, wherein the controller may control the driver such that the first discharging work is performed in a case where the instruction for performing the first discharging work is received by the discharging instruction receiver.

With the cell picking device according to item 2, in the first mode or the second mode, in a case where the number of cells that have been sucked into the pipette tip is not a desired number, it is not necessary to stop suction and wait for cells in the pipette tip to naturally fall from the pipette tip. Thus, cells in the pipette tip can be immediately returned into the sample container from the pipette tip by an instruction provided by the user. Therefore, a period of time it takes until the sucking work is performed again is shortened.

(Item 3) The cell picking device according to item 1 or 2, may further include a registration information receiver that receives registration information corresponding to the sample container, wherein the controller may control the driver such that the first advancing work ends based on the registration information received by the registration information receiver, in the first mode.

With the cell picking device according to item 3, the controller can stop advancement of the sucking member when the end of the pipette tip comes into contact with the bottom surface of the sample container. Thus, the end of the pipette tip is prevented from being damaged.

(Item 4) The cell picking device according to item 3, wherein the controller may control the driver such that the second advancing work ends based on the registration information received by the registration information receiver, in the second mode.

With the cell picking device according to item 4, the controller can stop advancement of the sucking member such that the end of the pipette tip does not come into contact with the bottom surface of the sample container. Thus, the contact between the end of the pipette tip and the bottom surface in the sample container in the second advancing work is prevented.

(Item 5) The cell picking device according to any one of items 1 to 4, wherein the controller may control the driver such that first retracting work for retracting the sucking member in the axial direction at a first speed until the end of the pipette tip reaches a predetermined height after the sucking work ends, and second retracting work for retracting the sucking member in the axial direction at a second speed larger than the first speed after the end of the pipette tip reaches the predetermined height, are performed, in the first mode or the second mode.

With the cell picking device according to item 5, the retraction speed of the pipette tip is relatively small until the end of the pipette tip reaches the predetermined height. Thus, even in a case where adhering to the sample due to surface tension or the like, sucked cells are prevented from falling into the sample again. On the other hand, after the end of the pipette tip reaches the predetermined height, the retraction speed of the pipette tip is relatively large. Therefore, retraction of the pipette tip completes in a short period of time. Thus, operability of the cell picking device can be improved.

(Item 6) The cell picking device according to item 5, wherein the predetermined height may be a height from the bottom surface in the sample container to a liquid surface of the sample in the sample container.

With the cell picking device according to claim 6, because the retraction speed of the pipette tip is relatively small until the end of the pipette tip is separated from a sample, cells are more reliably prevented from falling into the sample again. On the other hand, after the end of the pipette tip is separated from the sample, the retraction of the pipette tip can be completed in a short period of time. Further, cells can be prevented from being exposed to the atmosphere for a long period of time.

(Item 7) The cell picking device according to items 1 to 6, wherein the controller may control the driver such that the sucking work is performed in a period in which the tilting work is performed, in the first mode.

With the cell picking device according to item 7, cells that have been stripped from the bottom surface of the sample container by the end of the pipette tip can be sucked more efficiently.

(Item 8) The cell picking device according to items 1 to 7, wherein the controller may control the driver such that tilt releasing work for releasing a tilt of the sucking member that has been tilted by the tilting work is performed after the sucking work ends, in the first mode.

With the cell picking device according to item 8, the attitude of a pipette tip following suction of cells returns to the attitude prior to the tilting work of the sucking member. Therefore, cells can be sucked successively as described above by simple control.

(Item 9) A cell picking method according to another aspect of sucking cells from a liquid sample in a sample container, may include switching a work mode between a first mode and a second mode, performing first advancing work for bringing an end of the pipette tip into contact with a bottom surface in the sample container by causing the sucking member to advance in an axial direction of the pipette tip with the pipette tip, attached to the sucking member, being tilted with respect to a vertical direction, scanning work for scanning the bottom surface of the sample container toward a first position using the end of the pipette tip by moving the sucking member in a horizontal direction, tilting work for lifting the end of the pipette tip and lowering a base of the pipette tip in the first position by tilting the sucking member further with respect to the vertical direction, and sucking work for sucking a sample in the sample container through the sucking member and the pipette tip, in the first mode, and performing second advancing work for causing the end of the pipette tip to advance to a second position farther upward than the first position in the sample container by causing the sucking member to advance in the axial direction of the pipette tip with the pipette tip, attached to the sucking member, being tilted with respect to the vertical direction, and the sucking work, in the second mode.

With the cell picking method according to item 9, the work mode of the driver can be switched between the first mode and the second mode. In the first mode, with the tip of the pipette tip being in contact with the bottom surface in the sample container, the pipette tip scans the bottom surface of the sample container in a horizontal direction, and a sample is sucked. Thus, cells adhering to the bottom surface in the sample container are scraped by the end of the pipette tip. Further, in the second mode, a sample is sucked with the end of the pipette tip located between the bottom surface in the sample container and the liquid surface of sample. Thus, cells in suspension in the liquid sample in the sample container are sucked. As a result, the work mode of the driver is switched in accordance with a state of cells in the sample, whereby cells in the sample can be sucked efficiently.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A method of cell picking for sucking cells from a liquid sample in a sample container with a cell picking device, the cell picking device comprising:
   a sucking member to which a pipette tip is attachable;
   a driver that moves the sucking member and performs suction through the sucking member and the pipette tip;
   a work mode switcher, comprising a processor and memory, which is configured to switch a work mode of the driver between an adherent cell mode and a suspension cell mode; and
   a controller that controls the driver;
   the method comprising:
   switching the work mode between the adherent cell mode and the suspension cell mode by the work mode switcher;
   performing first advancing work for bringing an end of the pipette tip into contact with a bottom surface in the sample container by causing the sucking member to advance in an axial direction of the pipette tip with the pipette tip, attached to the sucking member, being tilted with respect to a vertical direction, scanning work for scanning the bottom surface of the sample container toward a first position using the end of the pipette tip by moving the sucking member in a horizontal direction, tilting work for lifting the end of the pipette tip and lowering a base of the pipette tip in the first position by tilting the sucking member further with respect to the vertical direction, and sucking work for sucking the sample in the sample container through the sucking member and the pipette tip from stripped cells adhering to the bottom surface in the sample container, in the adherent cell mode by the controller; and performing second advancing work for causing the end of the pipette tip to advance to a second position farther upward than the first position in the sample container by causing the sucking member to advance in the axial direction of the pipette tip with the pipette tip, attached to the sucking member, being tilted with respect to the vertical direction, and the sucking work for sucking cells in suspension in the liquid sample with the end of the pipette tip located in the second position, in the suspension cell mode by the controller, wherein the second position is located between the bottom surface in the sample container and a liquid surface in the sample container.

2. The method according to claim 1, wherein the cell picking device further comprises a discharging instruction receiver that receives an instruction for performing first discharging work for discharging a sample that has been sucked into the pipette tip into the sample container in the adherent cell mode or the suspension cell mode, and the controller further performs the first discharging work in a case where the instruction for performing the first discharging work is received by the discharging instruction receiver.

3. The method according to claim 1, wherein the cell picking device further comprises a registration information receiver that receives registration information corresponding to the sample container, and the controller ends the first advancing work based on the registration information received by the registration information receiver, in the adherent cell mode.

4. The method according to claim 3, wherein the controller ends the second advancing work based on the registration information received by the registration information receiver, in the suspension cell mode.

5. The method according to claim 1, wherein the controller further performs first retracting work for retracting the sucking member in the axial direction at a first speed until the end of the pipette tip reaches a predetermined height after the sucking work ends, and second retracting work for retracting the sucking member in the axial direction at a second speed larger than the first speed after the end of the pipette tip reaches the predetermined height in the adherent cell mode or the suspension cell mode.

6. The method according to claim 5, wherein the predetermined height is a height from the bottom surface in the sample container to a liquid surface of the sample in the sample container.

7. The method according to claim 1, wherein the controller performs the sucking work in a period in which the tilting work is performed, in the adherent cell mode.

8. The method according to claim 1, wherein the controller further performs tilt releasing work for releasing a tilt of the sucking member that has been tilted by the tilting work after the sucking work ends, in the adherent cell mode.

* * * * *